(12) United States Patent
Hara

(10) Patent No.: US 10,359,770 B2
(45) Date of Patent: *Jul. 23, 2019

(54) ESTIMATION OF ABNORMAL SENSORS

(71) Applicant: INTERNATIONAL BUSINESS MACHINES CORPORATION, Armonk, NY (US)

(72) Inventor: Satoshi Hara, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/026,887

(22) Filed: Jul. 3, 2018

(65) Prior Publication Data

US 2018/0329402 A1    Nov. 15, 2018

Related U.S. Application Data

(63) Continuation of application No. 14/839,272, filed on Aug. 28, 2015, now Pat. No. 10,082,787.

(51) Int. Cl.
*G05B 23/02* (2006.01)

(52) U.S. Cl.
CPC .................. *G05B 23/0221* (2013.01)

(58) Field of Classification Search
CPC ........ G01D 3/08; G06F 17/18; G07C 5/0808; H02H 1/0023; H02H 1/0092
See application file for complete search history.

(56) References Cited

U.S. PATENT DOCUMENTS

| 7,096,159 | B2 | 8/2006 | Cataltepe et al. |
| 8,359,178 | B2 | 1/2013 | Rowe et al. |
| 8,483,669 | B2* | 7/2013 | Manolescu ............ H04W 4/38 |
| | | | 455/414.1 |
| 8,706,676 | B2 | 4/2014 | Claxton et al. |
| 9,558,601 | B2* | 1/2017 | Lu ........................ B64D 45/00 |

(Continued)

FOREIGN PATENT DOCUMENTS

JP    2010-078467    4/2010

OTHER PUBLICATIONS

Franke et al., ORDEN, Outlier Region Detection and Exploration in Sensor Networks, Jul. 2009, SIGMOD Publication, pp. 1-3 (Year: 2009).*

(Continued)

*Primary Examiner* — Elias Desta
(74) *Attorney, Agent, or Firm* — Tutunjian & Bitetto, P.C.; Vazken Alexanian

(57) ABSTRACT

Provided is an estimation apparatus including a memory device having program code stored thereon, and at least one processor operatively coupled to the memory device. The at least one processor is operable to execute program code stored on the memory device to calculate, for each of a plurality of sensor groups that each include two sensors among a plurality of sensors, a degree of outlierness of target data serving as an examination target relative to a reference data distribution of output from the sensor group, and to estimate a sensor among the plurality of sensors to be a source of outlierness, based on a comparison of the degrees of outlierness of the sensor groups that include the at least one sensor to the degrees of outlierness of the sensor groups that lack the at least one sensor.

20 Claims, 9 Drawing Sheets

(56) References Cited

U.S. PATENT DOCUMENTS

2008/0287144 A1* 11/2008 Sabata .................... H04L 67/12
455/456.6
2014/0379302 A1 12/2014 Park

OTHER PUBLICATIONS

List of IBM Patents or Patent Applications Treated as Related dated Jul. 3, 2018, 2 pages.
Chitradevi, et al., "Efficient Density Based Techniques for Anomalous Data Detection in Wireless Sensor Networks", Journal of Applied Science and Engineering, vol. 16, No. 2, Jun. 2012, pp. 211-223.
Franke, et al., "Detection and Exploration of Outlier Regions in Sensor Data Streams", IEEE International Conference on Data Mining Workshops, ICDMW, Dec. 2008, pp. 1-10.
Sharma et al., "Sensor Faults: Detection Methods and Prevalence in Real-World Datasets", ACM Transactions on Sensor Networks, Jun. 2010, pp. 1-34, vol. 6, Issue 3.

* cited by examiner

ESTIMATION OF ABNORMAL SENSORS

BACKGROUND

Technical Field

The present invention relates to estimating abnormal sensors.

Related Art

A conventional method includes mounting a plurality of sensors in a complex system such as an automobile or manufacturing apparatus, analyzing a plurality of pieces of time sequence data acquired from the plurality of sensors, and monitoring the presence of abnormalities, as shown in Japanese Patent Application Publication No. 2010-78467, for example.

With such a method, the amount of sensor abnormality is scored and identified based on the amount of change in the relational structure between groups of sensors including a group of sensors indicating detection results for which an input signal is within a normal signal range, i.e. normal sensors, and a group of sensors indicating detection results for which the input signal is in an abnormal signal range, i.e. abnormal sensors, from the pieces of time sequence data. However, with a method such as described in Japanese Patent Application Publication No. 2010-78467, the relational structure between the sensors has a linear relationship, and therefore it is difficult to handle a complex non-linear relationship that actually occurs among a plurality of sensors. In other words, with the conventional processing method, even when there is normal data corresponding to a non-linear relationship among the sensors, this data could be judged to be abnormal due to being an outlier from a linear model. Furthermore, with the conventional processing method, even when there is abnormal data that is an outlier from the non-linear relationship among the sensors, this data could be judge to be normal if the data matches a linear model.

SUMMARY

According to a first aspect of the present invention, provided is an apparatus including a target data acquiring section operable to acquire target data serving as an examination target, the target data output by a plurality of sensors, a calculating section operable to calculate, for each of a plurality of sensor groups that each include at least two sensors among the plurality of sensors, a degree of outlierness of the target data relative to a reference data distribution of output from the sensor group, and an estimating section operable to estimate a sensor among the plurality of sensors to be a source of outlierness, based on a calculation result of the calculating section. The first aspect may be operable to cause the reference data distribution to be compatible with the relational structure among the sensors, thereby enabling the handling of any linear or non-linear relationship among the sensors. The first aspect is also provided as a method and a computer program product.

According to a second aspect of the present invention, provided is an apparatus in which the calculating section is further operable to calculate, for each of the plurality of sensors, the degree of outlierness of each sensor group including the sensor, and the estimating section is further operable to calculate, for each sensor, a degree of association with which the sensor is associated with outlierness, from the at least two degrees of outlierness calculated for the groups including the sensor, and estimates whether the sensor is a source of outlierness based on the degree of association calculated for each sensor. The second aspect may be operable to estimate the sources of outlierness and easily perform the estimation based on the degree of association between two sensors.

According to a third aspect of the present invention, provided is an apparatus in which the estimating section is further operable to estimate each sensor having a degree of association that is greater than or equal to a reference value relative to be a source of outlierness. The third aspect may be operable to perform the estimation operation based on the reference value, even if the number of sensors that are causes of outlierness are not discovered.

According to a fourth aspect of the present invention, provided is an apparatus in which the estimating section is further operable to sequentially select sensors to be sources of outlierness, in order of degree of association beginning with a sensor having a highest degree of association. The fourth aspect may be operable to select the sensors to be sources of outlierness in a probable order, and may be operable to attach a score of the probable order to the selected sensors.

According to a fifth aspect of the present invention, provided is an apparatus including a reference data acquiring section operable to acquire reference data serving as a reference for output of the plurality of sensors, and a distribution generating section operable to generate, for each of the plurality of sensor groups, a reference data distribution of output from the sensor group. The fifth aspect may be operable to generate the reference data distribution corresponding to the relational structure among the sensors.

According to a sixth aspect of the present invention, provided is an apparatus including a reference data acquiring section operable to acquire reference data serving as a reference for output of a plurality of sensors, a distribution generating section operable to generate, for each of a plurality of sensor groups that each include at least two sensors among the plurality of sensors, a reference data distribution of output from the sensor group, and an output section operable to output the reference data distribution generated for each sensor group. The sixth aspect may be operable to generate the reference data distribution corresponding to the relational structure among the sensors, independently from the estimating apparatus that estimates the sensors that are causes of outlierness. The sixth aspect is also provided as a computer program product.

According to a seventh aspect of the present invention, provided is an apparatus including a memory device having program code stored thereon, and at least one processor operatively coupled to the memory device. The at least one processor is operable to execute program code stored on the memory device to calculate, for each of a plurality of sensor groups that each include at least two sensors among a plurality of sensors, a degree of outlierness of target data serving as an examination target relative to a reference data distribution of output from the sensor group, and estimate at least one sensor among the plurality of sensors to be a source of outlierness, based on a comparison of the degrees of outlierness of the sensor groups that include the at least one sensor to the degrees of outlierness of the sensor groups that lack the at least one sensor.

According to an eighth aspect of the present invention, provided is an apparatus including a memory device having program code stored thereon, and at least one processor operatively coupled to the memory device. The at least one processor is operable to execute program code stored on the memory device to generate, for each of a plurality of sensor groups that each include at least two sensors among a plurality of sensors, a reference data distribution of output from the sensor group based on reference data serving as a reference for output of the plurality of sensors, and to output the reference data distribution generated for each of the sensor groups, to be used by an apparatus that calculates, for each of the plurality of sensor groups, a degree of outlierness of target data serving as an examination target output from the plurality of sensors relative to the reference data distribution, and estimate sensors that are sources of outlierness.

According to a ninth aspect of the present invention, provided is a method including calculating, for each of a plurality of sensor groups that each include at least two sensors among a plurality of sensors, a degree of outlierness of target data serving as an examination target relative to a reference data distribution of output from the sensor group, and estimating at least one sensor among the plurality of sensors to be a source of outlierness, based on a comparison of the degrees of outlierness of the sensor groups that include the at least one sensor to the degrees of outlierness of the sensor groups that lack the at least one sensor.

According to a tenth aspect of the present invention, provided is a computer program product including a non-transitory computer readable storage medium having program code embodied therewith. The program code is executable by a computer to cause the computer to perform operations including calculating, for each of a plurality of sensor groups that each include at least two sensors among a plurality of sensors, a degree of outlierness of target data serving as an examination target relative to a reference data distribution of output from the sensor group, and estimating at least one sensor among the plurality of sensors to be a source of outlierness, based on a comparison of the degrees of outlierness of the sensor groups that include the at least one sensor to the degrees of outlierness of the sensor groups that lack the at least one sensor.

According to an eleventh aspect of the present invention, provided is a computer program product including a non-transitory computer readable storage medium having program code embodied therewith. The program code is executable by a computer to cause the computer to perform operations including generating, for each of a plurality of sensor groups that each include at least two sensors among the plurality of sensors, a reference data distribution of output from the sensor group based on reference data serving as a reference for output of the plurality of sensors, and outputting the reference data distribution generated for each of the sensor groups, the reference data distribution being output for calculating, for each of the plurality of sensor groups, a degree of outlierness of target data serving as an examination target output from the plurality of sensors relative to the reference data distribution, and estimate sensors that are sources of outlierness.

The summary clause does not necessarily describe all features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
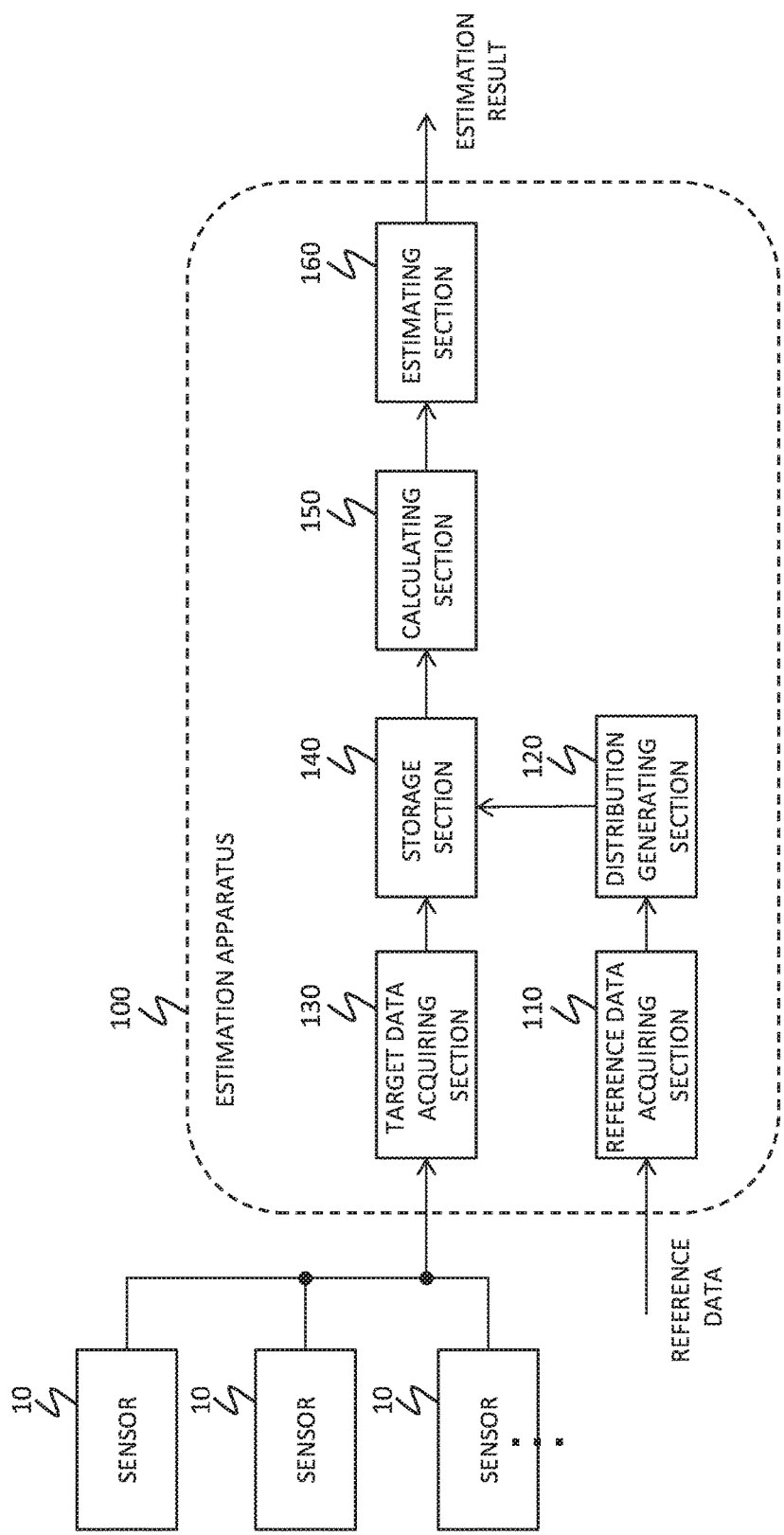
FIG. 1 shows an exemplary configuration of an estimation apparatus 100 along with a plurality of sensors 10, according to an embodiment of the present invention.

FIG. 1 shows an exemplary configuration of an estimation apparatus 100 along with a plurality of sensors 10, according to an embodiment of the present invention. The sensors 10 may be included with a target object, such as a transportation vehicle, e.g. an automobile, an airplane, a boat, etc., a manufacturing apparatus, a monitoring apparatus, etc., and may transfer detection results to the estimation apparatus 100. The sensors 10 may be connected to the estimation apparatus 100 through wires, or may be connected wirelessly.

The sensors 10 may be any type of sensor, such as temperature sensors, pressure sensors, position sensors, angle sensors, location sensors, fluid level sensors, rotational speed sensors, acceleration sensors, angular speed sensors, geomagnetic sensors, flow rate sensors, oxygen sensors, or the like. There can be any number of sensors 10, and in some embodiments there are more than a thousand sensors.

The estimation apparatus 100 of the present embodiment acquires the output of the plurality of sensors 10, which have a non-linear relationship among one another, and estimates the accuracy of any abnormal sensors among the plurality of sensors 10. The estimation apparatus 100 includes a reference data acquiring section 110, a distribution generating section 120, a target data acquiring section 130, a storage section 140, a calculating section 150, and an estimating section 160.

The reference data acquiring section 110 may be operable to acquire reference data serving as a reference for output of the plurality of sensors 10. The reference data acquiring section 110 may communicate with the sensors 10 and acquire, as the reference data, the output of the sensors 10 that are operating normally. If each of the sensors 10 are being operationally tested, then the reference data acquiring section 110 may acquire the results of the operational tests as the reference data.

The distribution generating section 120 may be operable to generate, for each of a plurality of sensor groups that are each obtained by selecting a portion of the plurality of sensors 10, a distribution of the reference data of the output from the sensor group. The distribution generating section 120 may communicate with the reference data acquiring section 110, receive the reference data of the sensors 10, and generate a distribution of the reference data. The distribution generating section 120 may form a set of two or more sensors 10 from among the plurality of sensors 10 as a sensor group. The distribution generating section 120 may form a set of a prescribed number of sensors 10 as a sensor group, and may generate the distribution of the reference data for each of these sensor groups. The distribution generating section 120 may generate the reference data distribution by using known distribution functions such as a normal distribution, a logistic distribution, a Poisson distribution, or a kernel function.

The target data acquiring section 130 may be operable to acquire target data for the examination target output by the plurality of sensors 10. The target data acquiring section 130 may communicate with the plurality of sensors 10 and acquire the target data. The target data acquiring section 130 may be connected to a network or the like, and acquire the target data via the network. The target data acquiring section 130 may read and acquire the target data stored in an external storage apparatus, such as a database.

The storage section 140 may be operable to store data to be processed by the estimation apparatus 100. The storage section 140 may communicate with the distribution generating section 120, receive the reference data distribution, and store the reference data distribution. The storage section 140 may communicate with the target data acquiring section 130, receive the target data, and store the target data. The storage section 140 may store each of the intermediate data, calculation results, parameters, and the like generated by (or used in) the process by which the estimation apparatus 100 outputs the estimation results. In response to a request from any component in the estimation apparatus 100, the storage section 140 may supply the stored data to the source of the request. In response to a request by the calculating section 150, the storage section 140 may supply the calculating section 150 with the stored reference data distribution and target data. The storage section 140 may be a computer readable storage medium such as an electric storage device, a magnetic storage device, an optical storage device, an electromagnetic storage device, a semiconductor storage device, etc.

The calculating section 150 may be operable to generate, for each of a plurality of sensor groups obtained by selecting a portion of the plurality of sensors 10, a degree of outlierness of the target data relative to the reference data distribution of the output from the sensor group. The calculating section 150 may communicate with the storage section 140 and read the stored reference data distribution and target data. The calculating section 150 may communicate with the distribution generating section 120 and/or the target data acquiring section 130, and receive the reference data distribution and/or the target data.

The calculating section 150 may calculate the degree of outlierness of the target data from the reference data distribution. The calculating section 150 may calculate how likely it is that the target data is an outlier. The calculating section 150 may calculate the degree of outlierness of the target data from the target data acquired from a sensor group and the reference data distribution of this sensor group. The calculating section 150 may sequentially calculate the corresponding degree of outlierness for each sensor group.

For each sensor group, the calculating section 150 may set the reference data distribution as a distribution of the output in history data, calculate the occurrence rate of target data corresponding to this output distribution, and calculate the degree of outlierness based on the occurrence rate. Alternatively, the calculating section 150 may calculate the degree of outlierness as a local outlier factor by using a known outlier detection method.

The calculating section 150 may be operable to calculate, for each of the plurality of sensors 10, the degree of outlierness of each set of two or more sensors 10 including the sensor 10. The calculating section 150 may calculate the degree of outlierness for a prescribed number of sensors 10 corresponding to the reference data distribution generated by the distribution generating section 120 for this prescribed number of sensors 10, e.g. this sensor group, using the target data acquired from this prescribed number of sensors 10. In other words, if the distribution generating section 120 selects sensor groups that each include two sensors 10 from among the plurality of sensors 10 and generates the reference data distribution for these groups, then the calculating section 150 may be operable to calculate the degree of outlierness for each of these sensor groups obtained by selecting two sensors 10 from among the plurality of sensors 10. The calculating section 150 may calculate, as the degree of outlierness of a plurality of sensors 10, the degree of outlierness of the target data output by the sensors 10 included in a sensor group relative to the reference data distribution of this sensor group.

The estimating section 160 may be operable to estimate a sensor 10 to be a source of outlierness, based on the calculation results of the calculating section 150. The estimating section 160 may communicate with the calculating section 150 and receive the degree of outlierness corresponding to the sensor groups. The estimating section 160 may calculate a degree of association with which the plurality of sensors 10 are related to this outlierness, based on the degrees of outlierness corresponding to the plurality of sensor groups. In other words, the estimating section 160 may be operable to calculate a degree of association with which each sensor 10 is associated with an outlierness, from two or more degrees of outlierness calculated for a set of two or more sensors 10 including this sensor 10.

The estimating section 160 may calculate the degree of association with which one sensor 10 is associated with outlierness, based on a plurality of degrees of outlierness corresponding to a plurality of sensor groups including this one sensor 10. The estimating section 160 may calculate, as the degree of association with which one sensor 10 is associated with outlierness, the sum of a plurality of degrees of outlierness corresponding to a plurality of sensor groups that include this one sensor 10.

The estimating section 160 may be operable to estimate whether each sensor 10 is a source of outlierness, based on the degree of association calculated for the sensor 10. The estimating section 160 may be operable to select sensors 10 that are sources of outlierness in order, beginning with the sensor 10 having the highest degree of association. The estimating section 160 may output the sensors 10 selected as sources of outlierness as the estimation result.

Each of the reference data acquiring section 110, distribution generating section 120, target data acquiring section 130, calculating section 150, and estimating section 160, may be a circuit, a shared or dedicated computer readable medium storing computer readable program instructions executable by a shared or dedicated processor, etc. The circuits, computer-readable mediums, and/or processors may be implemented in shared or dedicated servers.

The estimation apparatus 100 according to the present embodiment calculates, for each set including two or more sensors 10, i.e. for each sensor group, the degree of outlierness of the target data acquired from the two or more sensors 10. For each sensor 10, the estimation apparatus 100 calculates the degree of association of the sensor 10 from the plurality of degrees of outlierness corresponding to sensor groups including this sensor 10, and selects the sensors estimated to be sources of outlierness according to these degrees of association. An example of the operation of this estimation apparatus 100 is described using FIG. 2.

Figure 2:
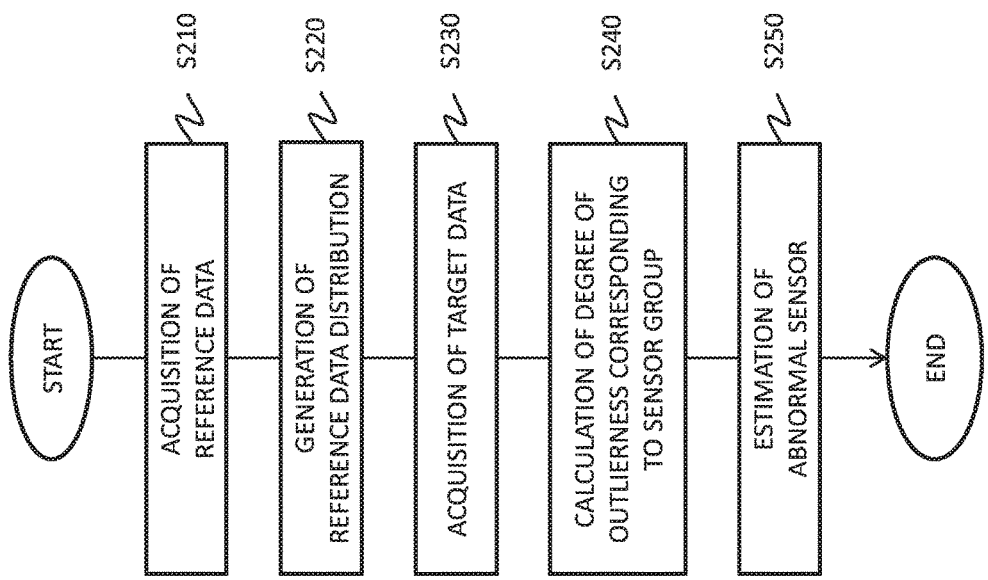
FIG. 2 shows an operational flow of an estimation apparatus, according to an embodiment of the present invention.

FIG. 2 shows an operational flow of an estimation apparatus, according to an embodiment of present invention. In the present embodiment, the estimation apparatus 100 selects and outputs sensors, such as sensors 10, estimated to be sources of outlierness, by performing the process from S210 to S250. In the example shown in FIG. 2, the estimation apparatus performs processing for a sensor group that is a set including two sensors. FIG. 2 shows an exemplary operational flow of an estimation apparatus, such as the estimation apparatus 100 shown in FIG. 1, but the estimation apparatus 100 shown in FIG. 1 is not limited to this operational flow, and the operational flow of FIG. 2 may be performed by other apparatuses.

First, a reference data acquiring section, such as the reference data acquiring section 110, may acquire the reference data (S210). The reference data acquiring section may acquire, as the reference data, output occurring in a case where the plurality of sensors is operating normally. For example, the reference data acquiring section may acquire, as the reference data, the output occurring in a case where the target object on which the plurality of sensors are mounted has operated for a prescribed time. Here, if the target object is a transportation vehicle, the reference data acquiring section may acquire, as the reference data, the output during a period when the target object moves a prescribed distance or within a prescribed range.

Next, a distribution generating section, such as the distribution generating section 120, may form sensor groups that each include a set of two sensors from among the plurality of sensors, and generate a distribution of the reference data for each sensor group (S220). In other words, the distribution generating section may generate a reference data distribution for the two sensors in each set of two sensors.

The distribution generating section may generate each reference data distribution for each sensor group of two sensors in a two-dimensional coordinate system, where the output of one of the two sensors is expressed on the X axis and the output of the other of the two sensors is expressed on the Y axis. If n reference data distributions are being generated for each sensor group of n sensors, the distribution generating section may generate the reference data distributions in an n-dimensional coordinate system, where the reference data of the n sensors is expressed in a coordinate system with n dimensions.

The distribution generating section may generate each reference data distribution using at least one known distribution. The distribution generating section may generate each reference data distribution by combining two or more known distributions. Since the relational structure among the plurality of sensors is a complex non-linear relationship, the distribution generating section preferably generates each of the reference data distributions using a distribution function that can handle this non-linear relationship.

The distribution generating section may generate the reference data distribution corresponding to such a non-linear relationship by using a kernel function (e.g. Gaussian kernel, Epanechnikov kernel, or Rectangular kernel) that is known as a kernel density estimation. Alternatively, the distribution generating section may generate each of the reference data distributions using a plurality of normal distributions. The distribution generating section may generate each of the reference data distributions by combining a plurality of distribution functions. If the processing time is to be shortened, the distribution generating section may generate each of the reference data distributions using one normal distribution.

The distribution generating section may generate the reference data distributions corresponding to all of the sensor groups, i.e. all combinations of two sensors, among the plurality of sensors. The distribution generating section may store the generated reference data distributions in a storage section, such as the storage section 140.

Next, a target data acquiring section, such as the target data acquiring section 130, may acquire the target data (S230). The target data acquiring section may acquire, as the target data, the output of the plurality of sensors. As an example, the target data acquiring section may acquire, as the target data, the output at a timing or during a time period when abnormalities are to be detected during operation of the target object on which the plurality of sensors are mounted. Here, if the target object is a transportation vehicle, the target data acquiring section may acquire, as the target data, the output during a time when the target object is moving.

If the output during a time when the target object moves a prescribed distance or within a prescribed range is acquired by the reference data acquiring section as the reference data, then the target data acquiring section may acquire, as the target data, the output of the target object during a time when the target object again moves the prescribed distance or in the prescribed range. In other words, the estimation apparatus may acquire in advance the reference data during a first period when the target object moves a prescribed amount, acquire the target data during a second period when the target object again moves the prescribed amount, and detect whether an abnormality has occurred during the second period based on the reference data and the target data.

Next, for each sensor group, a calculating section, such as the calculating section 150, may calculate the degree of outlierness between the target data of the two sensors of the sensor group and the reference data distribution corresponding to the sensor group (S240). If the distribution generating section generates the reference data distribution as two-dimensional coordinates based on the two sensors, then the calculating section may calculate the degree of outlierness between the target data of these two sensors and this reference data distribution.

If the distribution generating section generates the reference data distribution using a kernel function, then the calculating section may calculate the degree of outlierness of the target data as the occurrence rate of this data. The occurrence rate can be calculated as the kernel density estimation using a known calculation method. The calculating section may use the logarithm of the occurrence rate, in order to enlarge the range of the numbers being handled. Furthermore, the calculating section may multiply the occurrence rate by a negative coefficient, e.g. −1, such that the value becomes larger when the degree of outlierness is larger. In other words, the calculating section may calculate the negative log-likelihood as the degree of outlierness.

In this way, the calculating section may calculate the corresponding degree of outlierness for each sensor group. In other words, the calculating section may calculate the corresponding degree of outlierness for each set of two sensors. The calculating section may calculate the degree of outlierness for all of the sensor groups among the plurality of sensors. Here, with i representing the number of the first sensor included in a sensor group and j representing the number of the second sensor, the degree of outlierness can be represented as $\Gamma_{ij}$ (i≠j).

With d representing the number of sensors, the calculating section may calculate $\Gamma_{ij}$ as the combination of all the numbers of i and j from 1 to d ($\Gamma_{ij}=\Gamma_{ji}$). In this case, the calculating section arranges $\Gamma_{ij}$ in a matrix with i rows and j columns, and calculates the value of $\Gamma_{ij}$ excluding the diagonal matrix (i=j).

Next, an estimating section, such as the estimating section 160, may estimate the sensors that are sources of outlierness based on the degree of outlierness $\Gamma_{ij}$ of the sensor groups (S250). The estimating section may estimate the sources of outlierness, e.g. the abnormal sensors, to be sensors that are included more often in sensor groups having a large value for the degree of outlierness $\Gamma_{ij}$. If the number of abnormal sensors is determined to be k, then the estimating section can obtain an estimation result of J={1, 2, . . . , k} for the mathematical set of abnormal sensors, by solving the combinatorial optimization problem for the following two expressions.

$$\hat{J}=\{1,2,\ldots,d\}\backslash\hat{I} \qquad \text{Expression 1:}$$

$$\hat{I}=\mathrm{argmin}_{I\subseteq\{1,2,\ldots,d\}}\Sigma_{i,j\in I}\Gamma_{ij}, s.t. |I|=d-k \qquad \text{Expression 2:}$$

Here, the estimation value of J has a "^" symbol appended thereto and is referred to as "J hat" on the left side of Expression 1. Furthermore, the mathematical set of sensors with a small degree of outlierness, i.e. normal sensors, is represented as I={1, 2, . . . , d-k}, and the estimated value of I has a "^" symbol appended thereto and is referred to as "I hat." Furthermore, the symbol "\" represents the mathematical set difference. In other words, Expression 1 expresses the estimated value of the abnormal sensors as the mathematical set obtained by subtracting the estimated value of the normal sensors from the mathematical set {1, 2, . . . , d} of the sensors, i.e. the complementary mathematical set of sensors with a small degree of outlierness.

Furthermore, argmin f(x) represents x in a case where f(x) is at a minimum, and Expression 2 means that the mathematical set I in a case where the right side of the expression, i.e. the total of the degree of outlierness $\Gamma_{ij}$ for i and j, is at a minimum is the estimated value for I. The number of terms in the mathematical set I is set to d-k as the constraint condition (s. t.).

The combinatorial optimization problem of Expression 1 and Expression 2 can be solved by known algorithms, software, or the like if the number of sensors d is approximately several hundred or less. Furthermore, even if the number of sensors d does exceed several hundred, it is possible to efficiently obtain an approximation solution using a known algorithm, such as a greedy algorithm, as described further below. Accordingly, the estimating section can accurately estimate the mathematical set of abnormal sensors.

If the number of abnormal sensors k is not determined, then the estimating section may estimate each mathematical set of abnormal sensors for a plurality of values of k. In this case, a user of the estimation apparatus may select a plausible estimation result based on the plurality of estimation results of the estimating section. Alternatively, the estimating section may estimate the mathematical set of abnormal sensors by combining a threshold value, setting value, or the like with a known algorithm such as the greedy algorithm described further below.

In the manner described above, the estimation apparatus of the present embodiment can estimate the abnormal sensors based on the degree of outlierness between the reference data distributions of the sensor groups and the target data of the sensor groups. The estimation apparatus generates the reference data distributions of the sensor groups according to a complex non-linear relationship among the sensors, and therefore can perform an estimation in accordance with the actual operation of the plurality of sensors. If it is assumed that the relational structure among the sensors is linear, then such a case would correspond to the reference data distributions of the sensor groups having a linear relationship. Accordingly, in cases where the distribution generating section according to the present embodiment generates the reference data distributions of the sensor as one normal distribution, the estimating section can perform the estimation more accurately than in cases where it is assumed that the relational structure among the sensors is linear.

Figure 3:
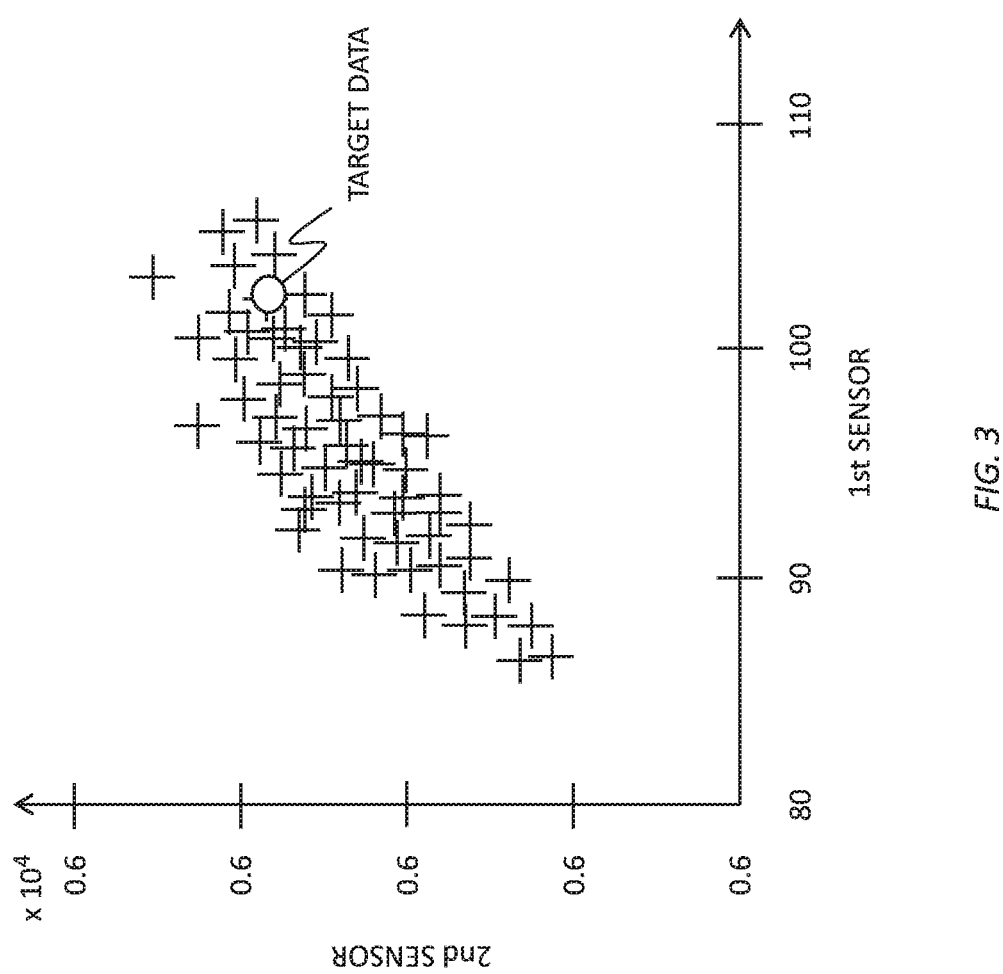
FIG. 3 shows a first example of a reference data distribution and target data, according to an embodiment of the present invention.

FIG. 3 shows a first example of a reference data distribution and target data, according to an embodiment of present invention. FIG. 3 shows an example in which a distribution generating section, such as the distribution generating section 120, expresses the reference data and the target data as two-dimensional coordinates, where output of one of the two sensors included in the sensor group is represented on the X axis and the output of the other sensor is represented on the Y axis. In other words, in FIG. 3, the horizontal axis (X axis) represents the data of a first sensor and the vertical axis (Y axis) represents the data of a second sensor. In the example of FIG. 3, the data indicated by a "+" symbol represents reference data for the sensor group of the first sensor and the second sensor, and data represented by a circular symbol represents the target data for the sensor group of the first sensor and the second sensor.

The distribution generating section may generate the reference data distribution based on the reference data of this sensor group. In other words, the distribution generating section may generate, as the reference data distribution, a distribution function in which the coordinate regions where more reference data is detected have larger values.

A calculating section, such as the calculating section 150, may calculate the degree of outlierness of the target data from this reference data distribution. In the example of FIG. 3, the target data is detected within a range over which the reference data is distributed, and therefore the calculating section may calculate the degree of outlierness to be a smaller value. In other words, the target data of the sensor group, i.e. the first sensor and the second sensor, is within a range of the distribution of the reference data acquired from the sensor group when operating normally, and therefore this sensor group can be estimated to be operating normally.

Figure 4:
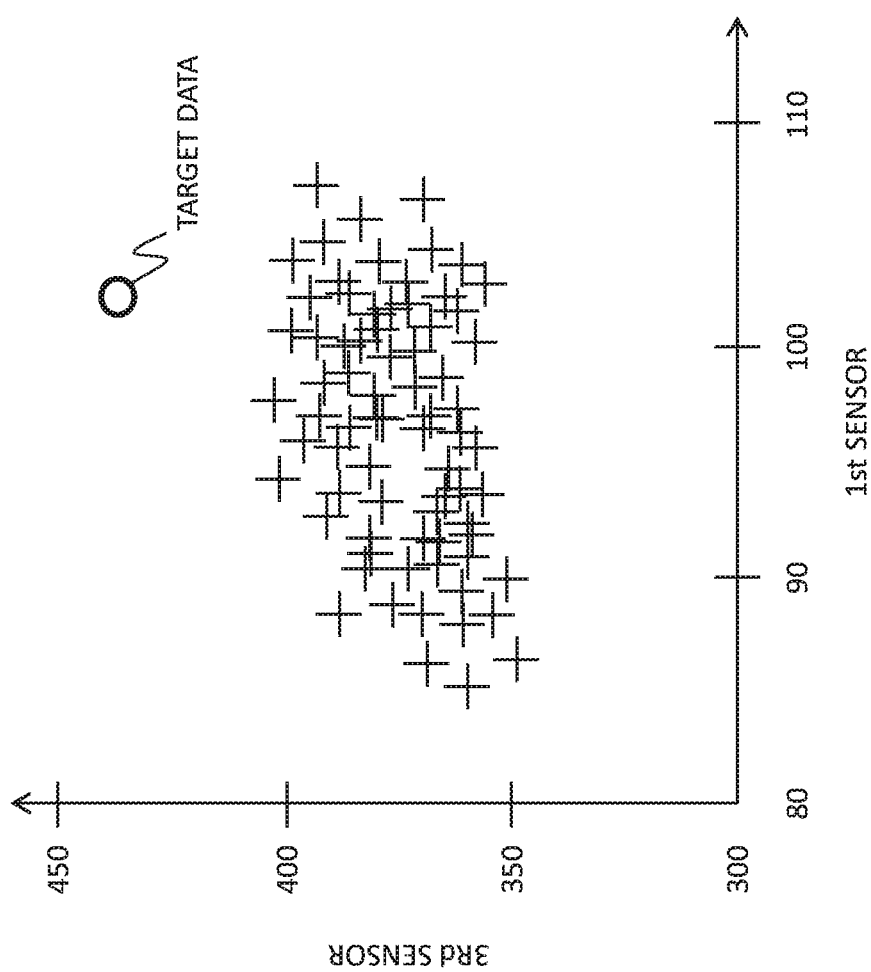
FIG. 4 shows a second example of a reference data distribution and target data, according to an embodiment of present invention.

FIG. 4 shows a second example of a reference data distribution and target data, according to an embodiment of present invention. In the same manner as in FIG. 3, FIG. 4 shows an example in which the reference data and the target data are expressed as two-dimensional coordinates, where output of one of the two sensors included in the sensor group is represented on the X axis and the output of the other sensor is represented on the Y axis. In other words, in FIG.

4, the horizontal axis (X axis) represents the data of a first sensor and the vertical axis (Y axis) represents the data of a third sensor. In the example of FIG. 4, the data indicated by a "+" symbol represents reference data for the sensor group of the first sensor and the third sensor, and data represented by a circular symbol represents the target data for the sensor group of the first sensor and the third sensor.

A distribution generating section, such as the distribution generating section 120, may generate the reference data distribution based on the reference data of this sensor group. In other words, the distribution generating section may generate, as the reference data distribution, a distribution function in which coordinate regions where more reference data is detected have larger values.

A calculating section, such as the calculating section 150, may calculate the degree of outlierness of the target data from this reference data distribution. In the example of FIG. 4, the target data is detected outside of the range in which the reference data is distributed, and therefore the calculating section may calculate the degree of outlierness to be larger than the value of the degree of outlierness calculated for the example of FIG. 3. In other words, the target data of the sensor group, i.e. the first sensor and the third sensor, is outside of the range of the reference data distribution acquired from the sensor group when operating normally, and therefore at least one sensor of the sensor group can be estimated as possibly operating abnormally.

In the manner described above, the distribution generating section of the present embodiment generates a reference data distribution that reflects the non-linear relational structure among the sensors, and the calculating section calculates the degree of outlierness of the target data from this reference data distribution. Therefore, it is possible to calculate the degree of outlierness for each sensor group while reflecting the non-linear relational structure among the sensors. An estimation apparatus, such as the estimation apparatus 100, can calculate the degree of outlierness for all of the sensor groups by acquiring the reference data and target data from each of the sensors.

Figure 5:
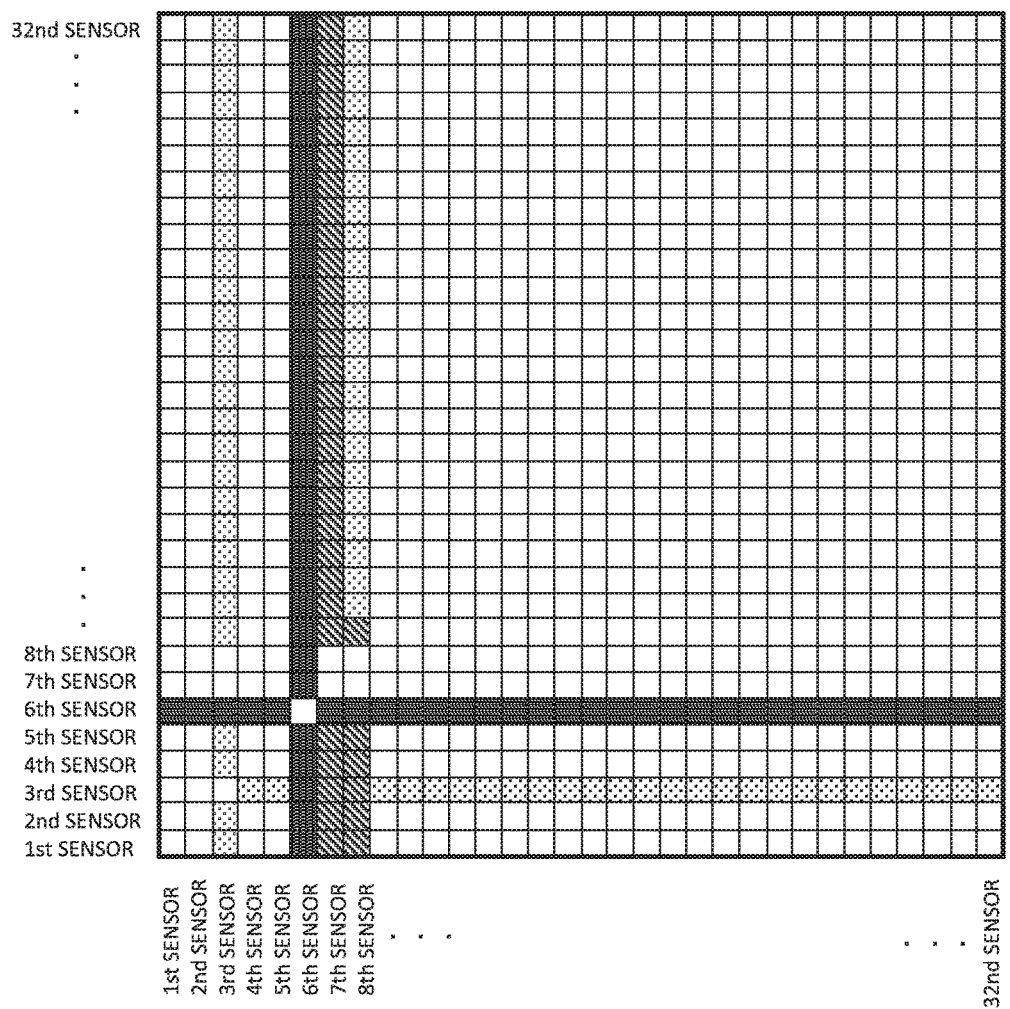
FIG. 5 shows an example in which the degree of outlierness of a sensor group is arranged in a matrix, according to an embodiment of present invention.

FIG. 5 shows an example in which the degree of outlierness $\Gamma_{ij}$ of a sensor group is arranged in a matrix with i rows and j columns, according to an embodiment of present invention. FIG. 5 shows an example in which the degrees of outlierness $\Gamma_{ij}$ of 32 sensors are represented by the shading amount in a pattern of squares in i rows and j columns. In FIG. 5, all of the squares in the sixth column (sixth row) are shown with a darker pattern than the other squares, and this indicates an example in which the degree of outlierness $\Gamma_{6j}$ ($\Gamma_{i6}$) is a larger value than the other degrees of outlierness. In other words, among the plurality of sensor groups, the degrees of outlierness of the sensor groups that include the sixth sensor exhibit a larger value than the degrees of outlierness of the other sensor groups. Therefore, it can be estimated that the sixth sensor is an abnormal sensor.

As shown in FIG. 5, an estimating section, such as the estimating section 160, has arranged the degree of outlierness $\Gamma_{ij}$ in a matrix, and may use a known estimation method of a greedy algorithm to estimate whether a sensor is an abnormal sensor. The estimating section may calculate, as each degree of association, the sum $\Sigma_j \Gamma_{ij}$ of the degree of outlierness $\Gamma_{ij}$ for each column of a matrix such as shown in FIG. 5. Alternatively or in addition, the estimating section may calculate, as each degree of association, the sum $\Sigma_i \Gamma_{ij}$ of the degree of outlierness $\Gamma_{ij}$ for each row of a matrix such as shown in FIG. 5.

The estimating section may select sensors that are sources of outlierness in order, beginning with the sensor having the highest degree of association. In other words, the estimating section may select the abnormal sensors in order beginning from a j-th sensor having the highest value for $\Sigma_i \Gamma_{ij}$, as the estimation result. Specifically, in the example of FIG. 5, the estimating section may estimate the sixth sensor to be an abnormal sensor, according to the sum $\Sigma_6 \Gamma_{ij}$ of the degree of outlierness of the sixth column having the largest value. The estimating section may then reduce the size of the matrix by removing the data in the sixth column and sixth row indicating the degree of outlierness of the sixth sensor, and perform an estimation of the next abnormal sensor.

Figure 6:
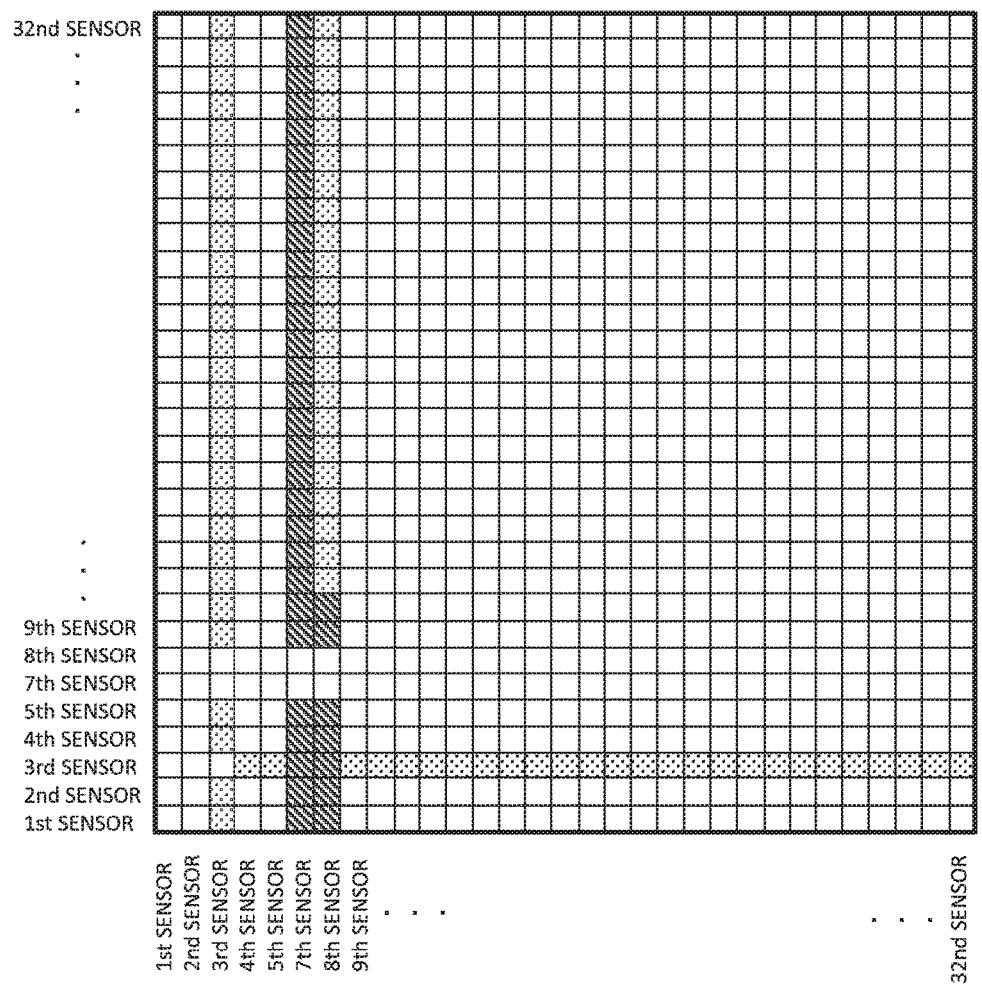
FIG. 6 shows an example of a matrix generated by removing the data in the column and row of the sensor estimated to be an abnormal sensor, according to an embodiment of present invention has estimated.

FIG. 6 shows an example of a matrix generated by removing the data in the column and row of the sensor estimated to be an abnormal sensor, according to an embodiment of present invention. An estimating section, such as the estimating section 160, may be operable to calculate the degree of association with which each sensor is associated with outlierness, from the degree of outlierness calculated for sets of sensors (sensor groups) that do not include the sensors already selected as sensors that are sources of outlierness. The estimating section may perform a subsequent estimation from the matrix shown in FIG. 6 having 31 columns and 31 rows, which is obtained by removing the target data of the sensor groups including the sixth sensor.

Specifically, in the example of FIG. 6, the estimating section may estimate the seventh sensor to be an abnormal sensor, according to the sum $\tau_6 \Gamma_{ij}$ of the degree of outlierness of the sixth column having the largest value. The estimating section may then reduce the size of the matrix by removing the data in the sixth column and sixth row indicating the degree of outlierness of the seventh sensor, and perform an estimation of the next abnormal sensor. Here, if the abnormal sensors are being estimated in order beginning with the sensor having the highest degree of association, then the estimating section may attach a score to each of the estimated abnormal sensors. The estimating section may attach a maximum score to the sixth sensor that is estimated first, and may attach a second-highest score to the seventh sensor that is detected next. The estimating section may use the value of the degree of association as the score.

Figure 7:
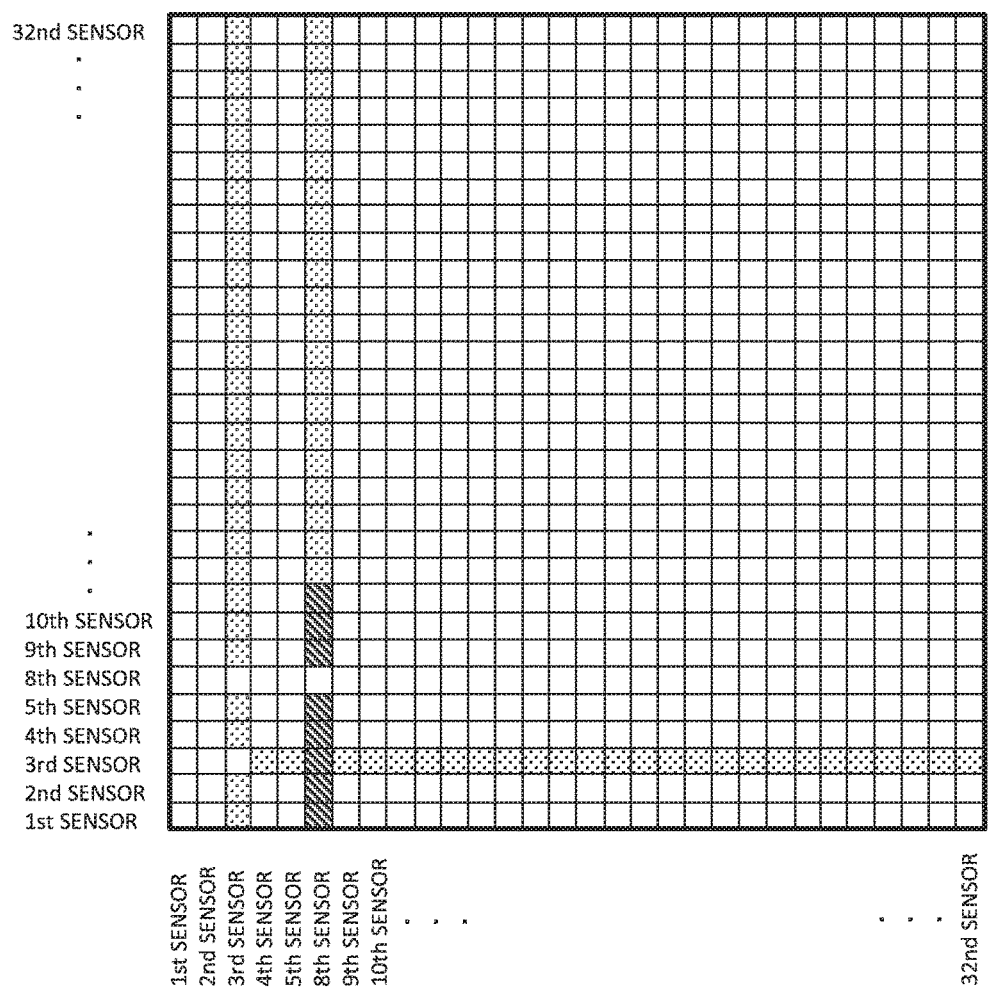
FIG. 7 shows another example of a matrix generated by removing the data in the column and row of the sensor estimated to be an abnormal sensor, according to an embodiment of present invention.

FIG. 7 shows another example of a matrix generated by removing the data in the column and row of the sensor estimated to be an abnormal sensor, according to an embodiment of present invention. The estimating section may perform the subsequent estimation from the matrix shown in FIG. 7 having 30 columns and 30 rows, which is obtained by removing the target data of the sensor groups including any one of the sixth sensor and the seventh sensor. If a number k of abnormal sensors is to be discovered, an estimating section, such as the estimating section 160, may repeat the estimation described above k times to sequentially estimate k abnormal sensors. In other words, the estimating section is operable to select a set number (or a predetermined number) of sensors as sensors that are sources of outlierness, in order beginning with a sensor having the highest degree of association.

If a number k of abnormal sensors is not to be discovered, then the estimating section may determine whether to repeat the estimation of the abnormal sensors. In other words, the estimating section may be operable to determine whether to further select a sensor that is a source of outlierness based on a total or an average of the degrees of outlierness calculated for the sets of sensors that do not include the sensors selected as sources of outlierness.

As an example, the estimating section may be operable to estimate that one sensor is a source of outlierness if the one sensor has a degree of association indicating an association that is greater than or equal to a reference value relative to the outlierness. Specifically, the estimating section may estimate that one sensor is an abnormal sensor if the degree of association of the one sensor is greater than a threshold value, reference value, or setting value, and then perform the next estimation. Furthermore, the estimating section may estimate that one sensor is not an abnormal sensor if the degree of association of the one sensor is less than a threshold value, reference value, or setting value, and then stop the estimation operation.

Alternatively, the estimating section may be operable to estimate that a sensor that has yet to be selected is a sensor that is not a source of outlierness if the degree of association of a most recently selected sensor differs from the next highest degree of association by an amount greater than or equal to a reference difference. Specifically, if the difference between the degree of association of one sensor and the degree of association of a sensor estimated as an abnormal sensor immediately prior thereto is less than a threshold value, reference value, or setting value, then the estimating section may estimate that this one sensor is also an abnormal sensor, and perform the next estimation. Furthermore, if the difference between the degree of association of one sensor and the degree of association of a sensor estimated as an abnormal sensor immediately prior thereto is greater than a threshold value, reference value, or setting value, then the estimating section may estimate that this one sensor is not an abnormal sensor, and stop the estimation operation.

If the sum of the degrees of association of the remaining sensors that have not yet been selected after one sensor has been selected and estimated as an abnormal sensor is less than a threshold value, reference value, or setting value, then the estimating section may estimate that these remaining sensors are not abnormal sensors, and stop the estimation operation. Furthermore, if the sum of the degrees of association of these remaining sensors is calculated in response to the repetition of the estimation operation, and the calculation result has decreased from the previous reference result by an amount greater than a reference value, then the estimating section may estimate that these remaining sensors are not abnormal sensors, and stop the estimation process.

In the manner described above, the estimating section of the present embodiment can output the sensors estimated to be abnormal sensors in order, by using a greedy algorithm. Furthermore, even when a number k of abnormal sensors is not to be discovered, the estimating section can perform an estimation of the abnormal sensors by using a threshold value or the like or by comparing the degrees of association. Alternatively, the estimating section can output a prescribed number of abnormal sensors, by repeating the estimation a set number of times or a predetermined number of times. The estimating section may estimate the sensors in order beginning with the sensor having the highest degree of association, and in this case can output the abnormal sensors in the probable order in which these sensors are estimated as abnormal. Furthermore, the estimating section can attach a score corresponding to the degree of association to the sensors estimated to be abnormal sensors and output these sensors.

Alternatively, the estimating section may estimate the sensors in order beginning with the sensor having the lowest degree of association. In other words, the estimating section may be operable to select sensors that are not sources of outlierness in order, beginning with the sensor having the lowest degree of association. In this case, the estimating section may be operable to estimate that one sensor is not a source of outlierness if the one sensor has a degree of association indicating an association that is less than a reference. Specifically, if one sensor has a degree of association that is less than a threshold value, a reference value, or a setting value, then the estimating section may estimate that this one sensor is a normal sensor.

The estimating section may be operable to calculate the degree of association with which each sensor is related to outlierness from the degree of outlierness calculated for the sets of sensors that do not include sensors already selected as sensors that are not sources of outlierness. The estimating section may perform subsequent estimations while decreasing the size of the matrix. If one sensor has a degree of association that is greater than a threshold value, a reference value, or a setting value, then the estimating section may estimate that this one sensor is an abnormal sensor. In this case, the estimating section may then perform the next estimation, or instead of this, if the remaining sensors have a degree of association higher than that of the sensor that has just been estimated as an abnormal sensor, the estimating section may estimate that all of these remaining sensors are abnormal sensors, and then end the estimation operation.

The estimating section may be operable to estimate that sensors that have not yet been selected are sensors that are sources of outlierness, if a difference between the degree of association of the sensor selected most recently and the next lowest degree of association is greater than or equal to a reference difference. Specifically, if the degree of association of one sensor is greater than the degree of association of the sensor estimated immediately prior by a threshold value, a reference value, or a setting value, then the estimating section may estimate that this one sensor is an abnormal sensor. If the degree of association of one sensor is less than the degree of association of the sensor estimated immediately prior by a threshold value, a reference value, or a setting value, then the estimating section may estimate that this one sensor is not an abnormal sensor and perform the next estimation.

The estimating section may repeat the estimation until there are no more sensors remaining after removal of the already estimated sensors among the plurality of sensors. Alternatively, the estimating section may be operable to select a set number of sensors or a predetermined number of sensors as sensors that are not sources of outlierness, in order beginning with the sensor having the lowest degree of association. In this way, the estimating section 160 can output the sensors 10 in order beginning with the sensors determined to be operating normally, by using a greedy algorithm.

In some embodiments, the estimation apparatus may acquire reference data and generates a reference data distribution. In other embodiments, an estimation apparatus may use a reference data distribution generated by an external apparatus, such as the estimation apparatus described in FIG. 8. In this case, the estimation apparatus may request the reference data distribution to the external apparatus.

Figure 8:
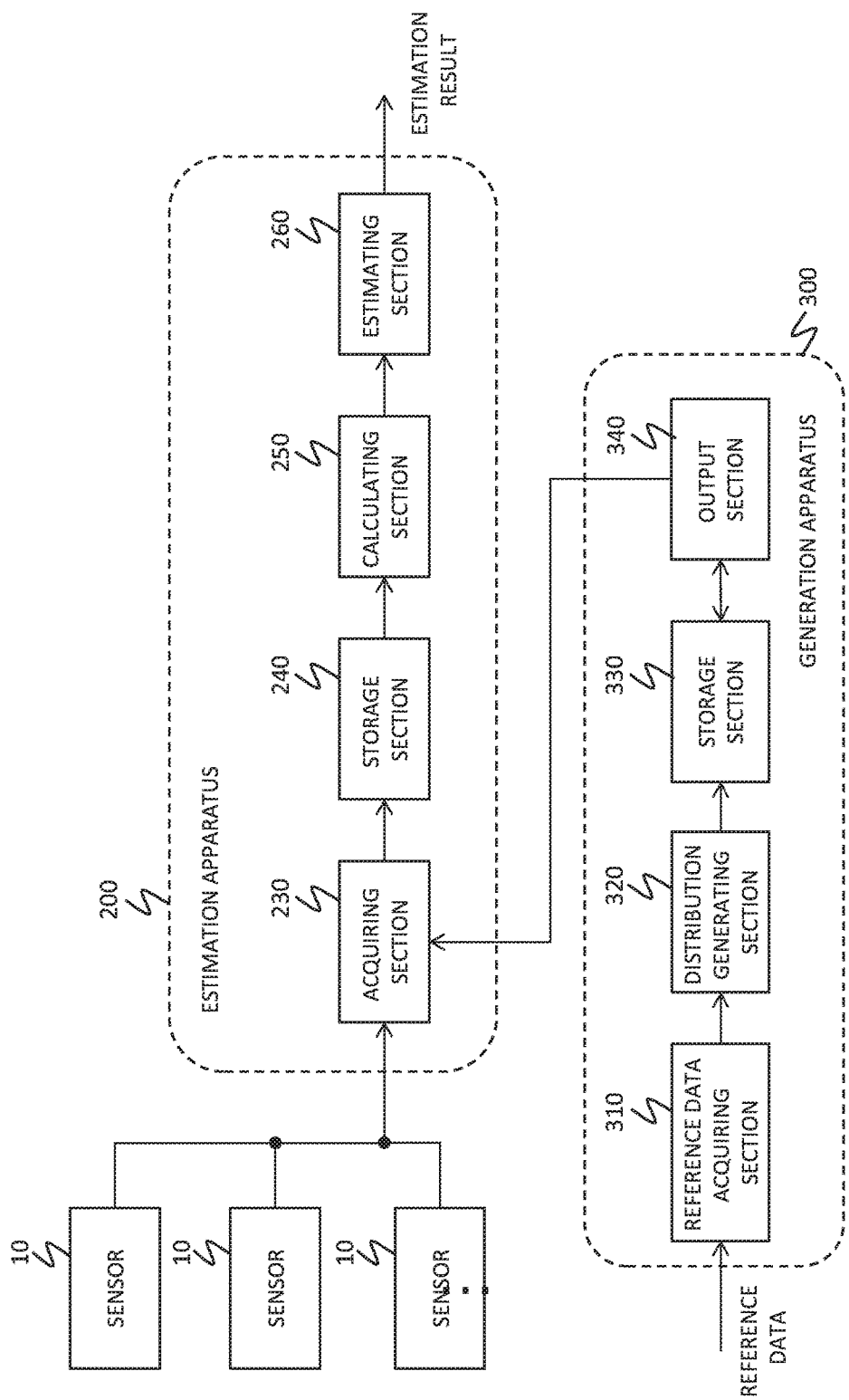
FIG. 8 shows an estimation apparatus 200, according to an embodiment of present invention.

FIG. 8 shows an estimation apparatus 200, according to an embodiment of present invention. The estimation apparatus 200 includes an acquiring section 230, a storage section 240, a calculating section 250, and an estimating section 260. The storage section 240, the calculating section 250, and the estimating section 260 may perform substantially the same operations as the storage section 140, the calculating section 150, and the estimating section 160 of the estimation apparatus 100 according to FIG. 1, except as otherwise indicated. Each of the acquiring section 230, calculating section 250, and estimating section 260, may be a circuit, a shared or dedicated computer readable medium storing computer readable program instructions executable by a shared or dedicated processor, etc. The storage section 240 may be a computer readable storage medium such as an electric storage device, a magnetic storage device, an optical storage device, an electromagnetic storage device, a semiconductor storage device, etc. The description of sensors 10 of is the same as in FIG. 1, except as otherwise indicated.

The acquiring section 230 may be operable to acquire target data serving as the examination target output by the plurality of sensors 10. The acquiring section 230 may communicate with the plurality of sensors 10 and acquire the target data. The acquiring section 230 may be operable to acquire a reference data distribution. The acquiring section 230 may acquire a reference data distribution generated by another apparatus, for example. Specifically, the acquiring section 230 may communicate with another apparatus and acquire the reference data distribution. The acquiring section 230 may supply the storage section 240 with the acquired target data and reference data distribution. Instead, the acquiring section 230 may supply the calculating section 250 with the acquired target data and reference data distribution.

In this way, the calculating section 250 may be operable to calculate the degree of outlierness of the target data relative to the reference data distribution. The estimating section 260 may be operable to estimate sensors 10 that are sources of outlierness, based on the calculation results of the calculating section 250. Specifically, the estimation apparatus 200 of the present embodiment can estimate a sensor 10 among the plurality of sensors 10 to be a source of outlierness by acquiring the reference data distribution generated by an external apparatus, for example, and the target data of the plurality of sensors 10. The external apparatus may be a generation apparatus 300 according to the present embodiment.

The generation apparatus 300 according to the present embodiment acquires the reference data of the plurality of sensors 10 and generates the reference data distribution. The generation apparatus 300 includes a reference data acquiring section 310, a distribution generating section 320, and an output section 340. Each of the reference data acquiring section 310, distribution generating section 320, and output section 340, may be a circuit, a shared or dedicated computer readable medium storing computer readable program instructions executable by a shared or dedicated processor, etc. The storage section 330 may be a computer readable storage medium such as an electric storage device, a magnetic storage device, an optical storage device, an electromagnetic storage device, a semiconductor storage device, etc.

The reference data acquiring section 310 may be operable to acquire reference data that is a reference for output of the plurality of sensors 10. The reference data acquiring section 310 may communicate with the plurality of sensors 10 and acquire, as the reference data, the output of the plurality of sensors 10 when operating normally. The reference data acquiring section 310 may operate in substantially the same manner as the reference data acquiring section 110 of the estimation apparatus 100 in FIG. 1, except as otherwise indicated.

The distribution generating section 320 may be operable to generate, for each of a plurality of sensor groups that are each obtained by selecting a portion of the plurality of sensors 10, a reference data distribution of the output from the sensor group. The distribution generating section 320 may communicate with the reference data acquiring section 310, receive the reference data of the plurality of sensors 10, and generate the reference data distribution. The distribution generating section 320 may be operable to generate, for each of a plurality of sensor groups that are each obtained by selecting two sensors 10 from among the plurality of sensors 10, a reference data distribution of the output from the sensor group. The distribution generating section 320 may operate in substantially the same manner as the distribution generating section 120 of the estimation apparatus 100 in FIG. 1, except as otherwise indicated.

The storage section 330 may be operable to store data to be processed by the generation apparatus 300. The storage section 330 may communicate with the distribution generating section 320, receive the reference data distribution, and store the reference data distribution.

The output section 340 may be operable to output a reference data distribution generated for each of the plurality of sensor groups, to be used by the estimation apparatus 200 to estimate sensors 10 that are sources of outlierness by calculating the degree of outlierness of the target data serving as the examination target output from the plurality of sensors 10. The output section 340 may communicate with the acquiring section 230 of the estimation apparatus 200 and supply the acquiring section 230 with the reference data distribution. The output section 340 may supply the acquiring section 230 with the reference data distribution via a network or the like.

The generation apparatus 300 of the present embodiment described above may generate the reference data distribution to be used by the estimation apparatus 200 to identify the sensors 10 that are sources of outlierness. In this way, the generation apparatus 300 can generate the reference data distribution corresponding to the complex relational structure among the sensors 10, independently from the estimation apparatus 200. Accordingly, the generation apparatus 300 may generate a more accurate reference data distribution by using a processing apparatus with greater processing capability, for example. In this way, the estimation apparatus 200 can perform the estimation of abnormal sensors using a processing apparatus that is more compact than the generation apparatus 300, for example. Accordingly, the estimation apparatus 200 may be implemented more easily in the apparatus on which the plurality of sensors 10 are mounted, for example, and can perform the estimation of abnormal sensors in real time.

Figure 9:
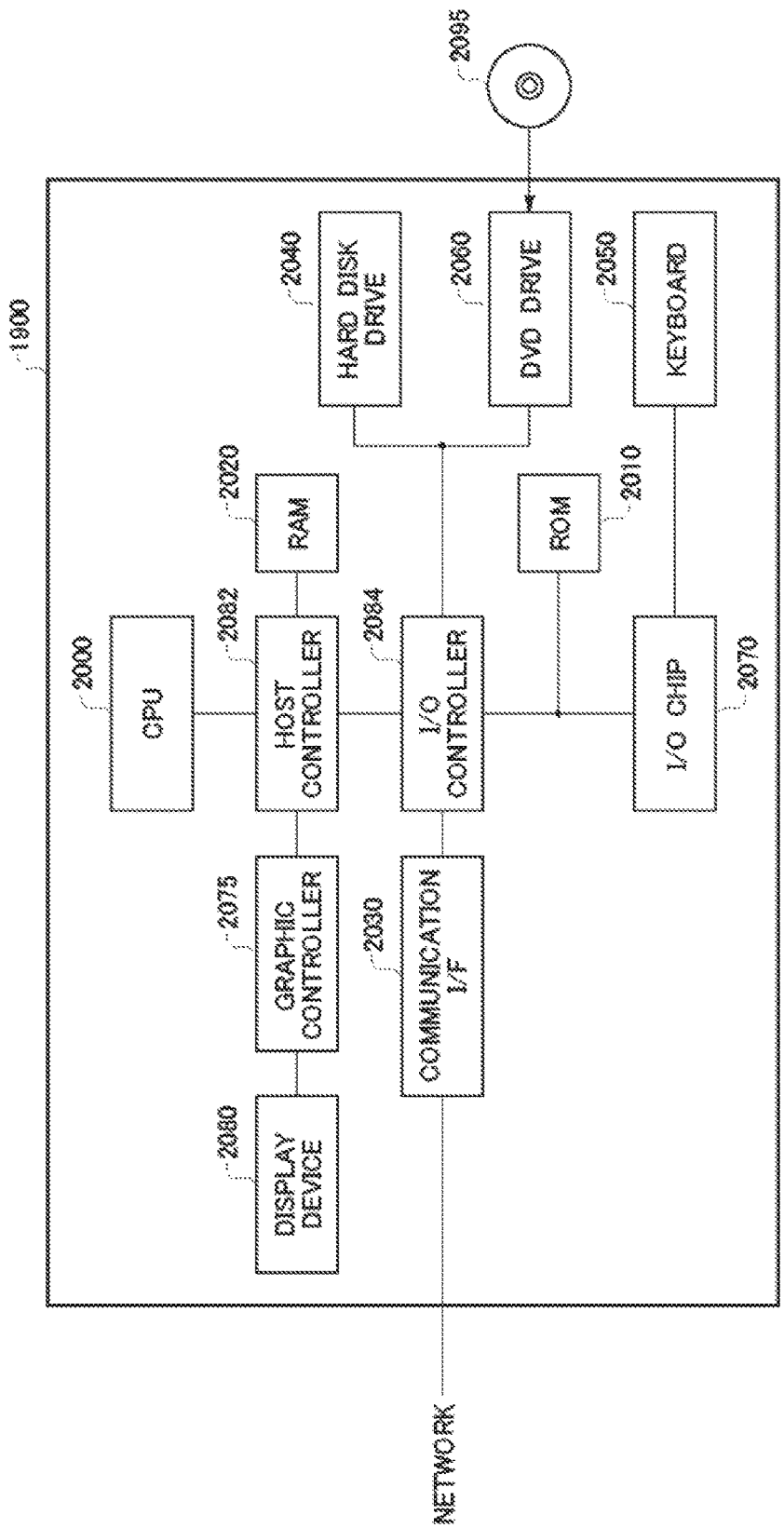
FIG. 9 shows an exemplary hardware configuration of a computer 1900 that functions as a system, according to an embodiment of the present invention.

FIG. 9 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an estimation apparatus, such as estimation apparatus 100 of FIG. 1, includes a reference data acquiring section, a distribution generating section, a target data acquiring section, a storage section, a calculating section, an estimating section, an acquiring section, and an output section. The program or module acts on the CPU 2000, to cause the computer 1900 to function as a reference data acquiring section, a distribution generating section, a target data acquiring section, a storage section, a calculating section, an estimating section, an acquiring section, and an output section, such as the reference data acquiring section 110, the distribution generating section 120, the target data acquiring section 130, the storage section 140, the calculating section 150, the estimating section 160, the acquiring section 230, the storage section 240, the calculating section 250, the estimating section 260, the reference data acquiring section 310, the distribution generating section 320, the storage section 330, and the output section 340 described above.

The information processing described in these programs is read into the computer 1900, to function as a reference data acquiring section, a distribution generating section, a target data acquiring section, a storage section, a calculating section, an estimating section, an acquiring section, and an output section, which are the result of cooperation between the program or module and the above-mentioned various types of hardware resources. Moreover, the estimation apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus comprising:
a memory device having program code stored thereon; and
at least one processor operatively coupled to the memory device and operable to execute program code stored on the memory device to:
calculate, for each of a plurality of sensor groups that each include at least two sensors among a plurality of sensors, a degree of outlierness of target data serving as an examination target relative to a reference data distribution of output from the sensor group; and
estimate at least one sensor among the plurality of sensors to be a source of outlierness, based on a comparison of the degrees of outlierness of the sensor groups that include the at least one sensor to the degrees of outlierness of the sensor groups that lack the at least one sensor.

2. The apparatus according to claim 1, wherein:
in calculating the degree of outlierness, the processor is further operable to calculate, for each of the plurality of sensors, the degree of outlierness of each sensor group including the sensor; and
in estimating the at least one sensor to be a source of outlierness, the processor is further operable to calculate, for each sensor, a degree of association with which the sensor is associated with outlierness, from the at least two degrees of outlierness calculated for the groups including the sensor, and estimate whether the sensor is a source of outlierness based on the degree of association calculated for each sensor.

3. The apparatus according to claim 2, wherein, in estimating the at least one sensor to be a source of outlierness, the processor is further operable to estimate each sensor having a degree of association that is greater than or equal to a reference value relative to be a source of outlierness.

4. The apparatus according to claim 2, wherein, in estimating the at east one sensor to be a source of outlierness, the processor is further operable to sequentially select sensors to be sources of outlierness, in order of degree of association beginning with a sensor having a highest degree of association.

5. The apparatus according to claim 4, wherein, in estimating the at least one sensor to be a source of outlierness, the processor is further operable to estimate that sensors that have not yet been selected are not sensors that are sources of outlierness, if a difference between the degree of association of a most recently selected sensor and a next highest degree of association is greater than or equal to a reference difference.

6. The apparatus according to claim 4, wherein, in estimating the at least one sensor to be a source of outlierness, the processor is further operable to sequentially select a set number of sensors to be sources of outlierness.

7. The apparatus according to claim 4, wherein, in estimating the at least one sensor to be a source of outlierness, the processor is further operable to calculate, for each sensor that has not been selected, the degree of association from the degrees of outlierness calculated for sensor groups that do not include sensors that have already been selected.

8. The apparatus according to claim 4, wherein, in estimating the at least one sensor to be a source of outlierness, the processor is further operable to determine whether to further select a sensor, based on a total or an average of the degrees of outlierness calculated for sensor groups that do not include sensors that have already been selected.

9. The apparatus according to claim 2, wherein, in estimating the at least one sensor to be a source of outlierness, the processor is further operable to estimate that each sensor having a degree of association less than a reference value is not a source of outlierness.

10. The apparatus according to claim 2, wherein, in estimating the at least one sensor to be a source of outlierness, the processor is further operable to sequentially select sensors not to be sources of outlierness, in order of degree of association beginning with a sensor having a lowest degree of association.

11. The apparatus according to claim 10, wherein, in estimating the at least one sensor to be a source of outlierness, the processor is farther operable to estimate that sensors that have not yet been selected are sensors that are sources of outlierness, if a difference between the degree of association of the most recently selected sensor and a next lowest degree of association of is greater than or equal to a reference difference.

12. The apparatus according to claim 9, wherein, in estimating the at least one sensor to be a source of outlierness, the processor is further operable to sequentially select a set number of sensors be sources of outlierness, in order of degree of association beginning with a sensor having a lowest degree of association.

13. The apparatus according to claim 10, wherein, in estimating the at least one sensor to be a source of outlierness, the processor is further operable to calculate, for each sensor that has not been selected, the degree of association from the degrees of outlierness calculated for sensor groups that do not include sensors that have already been selected.

14. The apparatus according to claim 1, wherein the processor is further operable to execute program code to:
acquire reference data serving as a reference for output of the plurality of sensors; and
generate, for each of the plurality of sensor groups, the reference data distribution of output from the sensor group based on the reference data.

15. The apparatus according to claim 1, wherein, in calculating the degree of outlierness, the processor is further operable to calculate the degree of outlierness for each sensor group.

16. An apparatus comprising:
a memory device having program code stored thereon; and
at least one processor operatively coupled to the memory device and operable to execute program code stored on the memory device to:
  generate, for each of a plurality of sensor groups that each include at least two sensors among a plurality of sensors, a reference data distribution of output from the sensor group based on reference data serving as a reference for output of the plurality of sensors; and
  output the reference data distribution generated for each of the sensor groups, to be used by an apparatus that calculates, for each of the plurality of sensor groups, a degree of outlierness of target data serving as an examination target output from the plurality of sensors relative to the reference data distribution, and estimate sensors that are sources of outlierness.

17. A method comprising:
calculating, for each of a plurality of sensor groups that each include at least sensors among a plurality of sensors, a degree of outlierness of target data serving as an examination target relative to a reference data distribution of output from the sensor group; and
estimating at least one sensor among the plurality of sensors to be a source of outlierness, based on a comparison of the degrees of outlierness of the sensor groups that include the at least one sensor to the degrees of outlierness of the sensor groups that lack the at least one sensor.

18. The method according to claim 17, wherein:
calculating the degree of outlierness further comprises calculating, for each of the plurality of sensors, the degree of outlierness of each sensor group including the sensor; and
estimating the at least one sensor to be a source of outlierness further comprises calculating, for each sensor, a degree of association with which the sensor is associated with outlierness, from the at least two degrees of outlierness calculated for the groups including the sensor, and estimating whether the sensor is a source of outlierness based on the degree of association calculated for each sensor.

19. A computer program product comprising a non-transitory computer readable storage medium having program code embodied therewith, the program code executable by a computer to cause the computer to perform operations comprising:
calculating, for each of a plurality of sensor groups that each include at least two sensors among a plurality of sensors, a degree of outlierness of target data serving as an examination target relative to a reference data distribution of output from the sensor group; and
estimating at least one sensor among the plurality of sensors to be a source of outlierness, based on a comparison of the degrees of outlierness of the sensor groups that include the at least one sensor to the degrees of outlierness of the sensor groups that lack the at least one sensor.

20. A computer program product comprising a non-transitory computer readable storage medium having program code embodied therewith, the program code executable by a computer to cause the computer to perform operations comprising:
generating, for each of a plurality of sensor groups that each include at least two sensors among the plurality of sensors, a reference data distribution of output from the sensor group based on reference data serving as a reference for output of the plurality of sensors; and
outputting the reference data distribution generated for each of the sensor groups, the reference data distribution being output for calculating, for each of the plurality of sensor groups, a degree of outlierness of target data serving as an examination target output from the plurality of sensors relative to the reference data distribution, and estimate sensors that are sources of outlierness.

* * * * *